United States Patent [19]

Hakanson et al.

[11] Patent Number: 4,570,197

[45] Date of Patent: Feb. 11, 1986

[54] STATIC REDUCTION IN MAGNETIC RECORDING CASSETTES

[75] Inventors: John D. Hakanson, South St. Paul; Gerald J. Niles, St. Paul, both of Minn.

[73] Assignee: Minnesota Mining & Manufacturing Company, St. Paul, Minn.

[21] Appl. No.: 455,316

[22] Filed: Jan. 3, 1983

[51] Int. Cl.$^4$ ............................................. G11B 23/02
[52] U.S. Cl. ................................... 360/132; 360/133; 242/197; 242/198; 427/128; 428/411.1; 428/694; 428/695; 428/900; 428/922
[58] Field of Search ........................ 427/131, 132, 128; 428/694, 900, 422, 411.1, 922, 695; 242/197, 198; 360/93, 132

[56] References Cited

U.S. PATENT DOCUMENTS

| | | | |
|---|---|---|---|
| 2,897,170 | 7/1959 | Gruber | 428/922 |
| 3,440,091 | 4/1969 | Delmore | 117/216 |
| 3,502,284 | 3/1970 | Loewenberg | 242/199 |
| 3,630,740 | 12/1971 | Joseph et al. | 96/85 |
| 3,783,021 | 1/1974 | York | 117/212 |
| 4,025,691 | 5/1977 | Trevoy | 428/411 |
| 4,104,175 | 8/1978 | Martinsson | 428/922 |
| 4,313,978 | 2/1982 | Stevens et al. | 427/384 |
| 4,345,284 | 8/1982 | Saito | 360/132 |
| 4,376,519 | 3/1983 | Ishida | 242/197 |

FOREIGN PATENT DOCUMENTS

| | | | |
|---|---|---|---|
| 2828940 | 2/1979 | Fed. Rep. of Germany | 360/132 |
| 2311380 | 12/1976 | France | 360/132 |
| 0042389 | 3/1980 | Japan | 242/197 |
| 0122275 | 9/1980 | Japan | 428/922 |
| 0057870 | 5/1981 | Japan | 428/922 |

*Primary Examiner*—Ellis P. Robinson
*Attorney, Agent, or Firm*—Donald M. Sell; James A. Smith; Mark A. Litman

[57] ABSTRACT

The provision of non-volatile, electrically conductive organic coatings to the surfaces of cassettes housing magnetic recording tape substantially reduces triboelectric charging.

20 Claims, No Drawings

STATIC REDUCTION IN MAGNETIC RECORDING CASSETTES

FIELD OF THE INVENTION

The present invention relates to a device and method for the reduction of static charge buildup in cassettes for housing magnetic recording tape. A non-volatile, organic, conductive coating composition is applied to the surfaces of components of the cassettes, dramatically reducing static charge buildup within the cassette.

BACKGROUND OF THE INVENTION

The problems of triboelectric charging and other forms of static charge buildup have long provided problems in various commercial areas. A large number of various methods have been developed over the years for dealing with this problem. Amongst the various techniques used to reduce electrostatic charge buildup are the application of conductive coatings to surfaces, the inclusion of conductive particulate matter or fibers within the composition, the matching of work functions of surfaces in movable contact with each other, exterior grounding of surfaces subject to charge, and even coating with compositions that suppress spark discharge. Each of these procedures has its own advantages and disadvantages, but are generally regarded in the art as equivalent in their ability to reduce static charge buildup.

BRIEF DESCRIPTION OF THE INVENTION

The present invention provides for an improved method of reducing electrostatic charge buildup in cassettes which house magnetic recording tape by the application of non-volatile, electrically conductive, organic coating compositions to surfaces of the cassettes and the components of the cassette. The coating composition is preferably applied to all surfaces which do not directly contact the magnetic recording tape during storage or playback mode, although those surfaces may also be coated. The coating composition is a non-integral, preferably non-film-forming composition which is applied to both interior and exterior surfaces and components in the cassette.

DETAILED DESCRIPTION OF THE INVENTION

Magnetic recording tapes are stored in various types of cassettes for their use in various fields within the industry. Magnetic tape containing cassettes are used in computors, in audio recording, audio-video recording, typewriting and other information storage and usage mediums. Even within the various fields of use described above, there are different formats in the industry. Cassettes are thus variously available for both 8-track (cartridges) and cassette audio recording (nominally 3.8 mm tape), and both U-Matic (three-quarter inch nominal) and VHS and BETA format (nominally one-half inch tape) audio-video recording devices. Newer formats, such as the 8 millimeter audio-video format, are already being tested and developed. These cassettes have traditionally been plagued with a problem of electrostatic charging during both manufacture and use. During manufacture, the molding and handling operations used to form the various parts of the cassette have caused generation of triboelectric charges within the cassette. When the cassette is then transported to the operating station where the tape is inserted into the cassette, significant problems are often encountered because of the residual or developed charge on the cassettes. Particulate matter, such as dust, is often attracted into the cassette and is also deposited upon the surface of the magnetic tape as it is inserted. The dust causes both aesthetic and functional problems with the use of the tape. During use of cassettes, static charge buildup will again attract particulate matter into and onto the cassette. The presence of dust on the tape itself can harm both the tape and the magnetic heads which read the tape. The appearance of dust on the cassette and the tape provides an unattractive and worrisome appearance to the user.

As noted above, cassettes presently are made with conductive materials included within the composition used to form the various surfaces and components of the cassettes. This moderately reduces the residual charge which cassettes can maintain, but residual charging in excess of 2000 volts is still quite common. The application, according to the present invention, of a non-volatile, conductive, organic coating composition to the surfaces of and the components of a cassette which houses magnetic recording tape has been found to be able to consistently reduce the residual charge in cassettes to less than 500 volts. Generally, electrostatic charging is held to less than 200 or even less than 100 volts in such cassettes. The residual charge is that charge retained on the body after charging of the body and exposure to air at 20° C. and 30 percent relative humidity for 20 hours.

The conductive coating composition of the present invention has been referred to as "non-volatile". In the practice of the present invention this means that, after evaporation of any solvents, less than 2 percent by weight per week of the coating composition will evaporate off the surface of an article at 25° C. and 40 percent relative humidity. Preferably less than 1 percent by weight per week would evaporate and, more preferably, less than 0.1 percent by weight per week would evaporate at those temperatures and conditions.

The greater the percentage of surfaces of components on and within the cassette that are coated with the organic, conductive coating compositions of the present invention, the greater the general reduction in electrostatic charging. This does not necessarily mean that greater amounts of the coating composition better reduce the electrostatic charging, but rather that it is important to insure the coating of as much surface area as possible in and on the cassette. Thus both interior and exterior surfaces of the cassette, reels, spools, structural supports, and other parts of the cassette should be coated. As the coating composition is likely to come in contact with the magnetic tape, which is not necessarily preferred, the coating composition should be selected so as to not be detrimental to the performance and structural integrity of the magnetic recording tape (e.g., it should not be a strong solvent for the structural component of the tape). The coating composition should generally be applied so as to provide a dry (without solvent) coating weight of between 0.5 (0.08 micrograms per square centimeter) and 250 micrograms per square inch (40 micrograms per square centimeter) as an average coating weight. Because the coating composition will not necessarily spread uniformly over the coated surface, or because of surface structure variations (such as an embossed non-glare surface), it is the average coating weight that must be considered in this range. If less than this amount of material is applied, insufficient antistatic protection will be provided. If greater than this amount is applied, no further antistatic protection is obtained, and an undesirable, highly greasy appearance will be provided to the coated article. Preferably a coating weight of 1–100 micrograms per square inch (0.16 to 16 micrograms per square centimeter) is used or more preferably 1–50 micrograms per square inch (0.16 to 8 micrograms per square centimeter). In the most preferred practice of the present invention, 5–30 micrograms per square inch of the coating composition is used.

The organic coating composition useful in the practice of the present invention may be any non-volatile, non-integral, organic, electrically conductive composition. It is highly preferred that the coating is non-integral as this provides the greatest static reduction. By "non-integral" it is meant that the composition does not form a self-supporting solid film when air dried, as it would be when present on the surface of the cassette. The term non-integral therefore excludes the provision of a solid, thermoplastic or non-liquid conductive coating composition to the surface of the cassette. Useful conductive coating compositions include the many antistatic agents and systems already known in the art including long chain alkyl quaternary amines, long chain alkyl quaternary phosphines, fluorinated antistatic materials, polymers having pendant antistatic, ionic groups such as quaternary amine groups, and other ionic, organic materials known for antistatic purposes in the art. The preferred material according to the practice of the present invention for use as an antistatic coating composition is the composition of U.S. Pat. No. 4,313,978. This particular composition provides extremely long lasting and high efficiency antistatic protection for cassettes. That antistatic composition comprises a fluorinated anionic surfactant which is an amine salt of an acid containing a fluorinated organic radical (as defined herein) and an antistatic agent which is an ionic salt of an amine. It has been found that the combination of the fluorinated surfactant and antistatic agent can provide a reduction in static charging at very low application amounts.

The surfactants used in that preferred composition of the present invention are anionic fluorocarbon surfactants which are the amine salts of acids containing a fluorinated organic radical. The preferred surfactants may generally be depicted by the formula:

$$R_f\text{-}A\text{-}X^-Z^+$$

in which
$R_f$ represent a fluorinated organic radical (as defined herein),
A represents a bond or a divalent linking group,
$X^-$ represents an acid anion, and
$Z^+$ represents a quaternary ammonium cation.

The fluorinated organic radical $R_f$ is defined as a radical which is a saturated, aliphatic radical having from 2 to 20 and preferably at least 3 carbon atoms, the skeletal chain of which may be straight, branched or, if sufficiently large, cycloaliphatic. The skeletal chain may be interrupted by divalent oxygen or trivalent nitrogen atoms bonded only to carbon atoms provided the radical does not contain more than one heteroatom, i.e., nitrogen or oxygen, for every two carbon atoms in the skeletal chain the radical being fully fluorinated with the exception that it may contain hydrogen or chlorine atoms as substituents provided that not more than one atom of either is present in the radical for each carbon atom. Preferably, the fluoroaliphatic radical is a perfluoroalkyl radical having a skeletal chain that is straight or branched.

The fluorinated organic radical is linked to the acid anion either by a direct bond or through the divalent linkage A. Preferably the chain of the linking group A is composed of carbon atoms although heteroatoms, e.g., nitrogen or oxygen, may be present provided they do not interfere with the ionic nature of the surfactant. Preferred linking groups are alkylene groups.

Particularly suitable acid anions $X^-$ include carboxylic acid and sulfonic acid groups.

Examples of suitable fluorinated organic radical containing anions $R_f\text{-}A\text{-}X^-$ include 5 to 18 carbon atom perfluorinated alkyls such as perfluoropentyl sulfonate and perfluoro-octylcarboxylate.

The quaternary ammonium groups $Z^+$ are derived from the corresponding amine. Suitable amines include aliphatic amines and aliphatic cyclic amines, which may optionally be substituted with substituents which will not affect the ionic nature of the surfactant. Preferably the amines contain 2 to 12 carbon atoms. Suitable amines include piperidine, dimethylaminoethanol, morpholine, triethanolamine and triethylamine.

Other suitable surfactants include those containing 2 or more acid anions and quaternary ammonium cations in which the acid anions are bonded directly to the fluorinated organic radical or via one or more linking groups. Preferably the fluorinated organic radical is pendant although it may be present within the molecule as in the case of the amine salts of $(C_2F_4COOH)_2$ and $(C_2F_4SO_3H)_2$. Anionic surfactants containing two or more fluorinated organic radicals may also be used.

The antistatic agent used in the preferred compositions is an ionic salt of an amine. The compounds have the property that they induce conductivity to the surface upon which they are applied. Suitable amines include those from which the quaternary ammonium groups $Z^+$ are derived. The anionic portion of the antistatic agent may be chosen from a wide variety of anions including halide, sulfate, aryl sulfonate, aliphatic sulfonate, aryl carboxylate and aliphatic carboxylate. The anions may contain further substituents providing they do not affect the antistatic properties of the compound, for example, the presence of nitrogen atoms and highly fluorinated radicals is undesirable in the anion.

Specific examples of anions include:
$C_7H_7SO_3^-$
$SO_4^-$
$Cl^-$
$CH_3(CH_2)_8CO_2^-$
$C_6H_5CO_2^-$
$CH_3CO_2^-$ The fluorinated surfactant and antistatic agent may be derived form the same of different amines.

The compositons are preferably applied from a single solution. Suitable solvents include lower alcohols, e.g., ethanol and isopropanol, which may be diluted with a low boiling fluorocarbon. Preferably the solvent is chosen such that the fluorinated surfactant and antistatic agent have substantially the same solubility so that the dried coating contains the same ratio of constituents as in the applied solution. If there is a substantial difference in the solubilities non-uniform coatings may result.

The ratio of fluorinated surfactant to antistatic agent in a composition depends upon the intended use.

The concentration of the solutions vary according to their intended use. Preferably the anion molar percent of the fluorinated organic radical is between 1 and 50%, preferably 1.8 and 47.9%, and most preferably between 15 and 40 percent of the mixture of the two ingredients. The present invention has been found to be independent of the specific antistatic composition used, although some, of course, perform better than others because of their physical properties.

The composition of the cassette is immaterial to the practice of the present invention, since triboelectric charging can occur on substantially all solid surfaces. Generally, however, only synthetic resin compositions are used for the major structural components of cassettes. These may be either thermoplastic or thermoset resins. Amongst the various resins normally used in the production of cassettes acrylonitrile-butadiene-styrene plastic, styrene-acrylonitrile resin, polystyrene, polycarbonates, high impact polystyrene and medium impact polystyrene, polyvinyl acetal and polyesters are generally used. Of course, dyes, fillers, molding aids and the like may be included within these compositions. Surprisingly, the inclusion of equal or larger quantities of antistatic materials into the composition used for structural portions of the cassette do not reduce static charging nearly as well as the applied coatings of the present invention, even where the same materials are used.

These and other aspects of the present invention will be shown in the following non-limiting examples.

EXAMPLE 1

The following formulation was prepared in our laboratory for spray application to plastic components:

|  | Parts by Weight |
| --- | --- |
| Additives |  |
| Piperidinium toluene sulfonate | 0.057 |
| Piperidinium perfluoro-octyl sulfonate | 0.023 |
| Polyethylene glycol 200 | 0.020 |
| Volatile Vehicle |  |
| Freon TF ® | 75.0 |
| Ethyl alcohol | 25.0 |

Properties: Clear Solution of 0.1% by weight non-volatile.

The solution was applied from a Binks Model 69 air spray gun to ABS plastic components of the VHS format. The electrical potential due to the electrostatic surface charge of each component was measured before and after spray treatment by means of a Monroe Model 175 electrostatic voltmeter. Results were as follows:

Before Treatment—2000 to 18,000 volts.
After Treatment—200 volts maximum.

The treated parts were subjected to the following conditions:
 (1) Rubbed briskly with Nylon carpet.
 (2) Stored in 5% relative humidity cabinet for three days.

Results: Charge level for both conditions remained below 200 volts.

The laboratory experiments were expanded to plant studies wherein technical feasibility of spray application to total assemblies was demonstrated. Evaluation of the treated assembled cassettes (VHS) confirmed the laboratory findings that electrostatic charges were reduced to an acceptably low level (less than 300 volts).

Competitive analyses were run on commercially available cassette products and the findings published; namely, that the subject invention treatment reduced cassette body charges below 100 volts whereas all commercially available cassettes were orders of magnitude higher (at 2000-11,000 volts).

Substantially identical results were obtained using isopropyl alcohol in place of the ethyl alcohol as solvent.

EXAMPLE 2

The following tests were performed on six different commercially available VHS format cassettes. The cassettes were first electrostatically charged to about 13,000 volts. Electrometer probes were placed adjacent to each of the cassettes (within one-quarter inch) to measure static electricity bleed-off at 76° F. and 42% relative humidity. The charge was measured at various time intervals (at least initially, 1, 2, 3, 4, 5 and 20 hours) and recorded. It was determined by analysis that cassettes C, D, E and F contained antistatic ingredients in the plastic composition of the cassette. The lowest level of static charge for any of the cassettes, even after 20 hours of air discharge, was 1550 volts.

EXAMPLE 3

The cassette B of Example 2 was used in the test procedure of Example 2 after being coated with the following antistatic coating compounds according to the present invention:
 (a) cationic, long-chain alkyl (greater than C-12) fatty acid condensate (Sandotex ®A)
 (b) quaternary amine sulfonic acid derivative (Avitex ®E)
 (c) vinyl polymer with quaternary amine pendant groups (DOW ®ECR 34)
 (d) dimethyl allyl ammonium chloride (Calgon-®E1515), and
 (e) piperidinium toluene sulfonate (1 part by weight) and piperidinium perfluorooctyl sulfonate (4 parts) as a 0.1% by weight solution in isopropanol.

Each of the antistatic compositions was found to reduce the residual static charge on the VHS cassettes to less than 500 volts in less than 20 hours. The last composition (e) displayed a residual voltage of less than 100 volts.

EXAMPLES 4-7

The effect of antistatic materials in the molding composition was compared to the same materials on the molded surface.

An acrylonitrile-butadiene-styrene molding resin, at a melt temperature of 470° F., was injected at 950 p.s.i. into a cassette mold at 150° F. In the first run, no antistatic agents were included in the molding resin. The three following runs respectively contained 0.01% by weight, 0.10% by weight and 1.0% by weight of the antistatic system of Example 1. The residual charge was measured in the same manner as Example 2 and are compared in the Table below with the coated cassette of Example 3(e).

| Example | Included Antistat. (% by weight) | Coated Antistat. | Charge |
| --- | --- | --- | --- |
| 4 | 0 | 0 | >2000 |
| 5 | 0.01 | 0 | >1700 |
| 6 | 0.1 | 0 | >1500 |
| 7 | 1.0 | 0 | >1800 |

-continued

| Example | Included Antistat. (% by weight) | Coated Antistat. | Charge |
|---------|----------------------------------|------------------|--------|
| 3(e)    | 0                                | <0.01%           | <200   |

The superiority of coated antistatic agent to included antistatic agent is apparent.

We claim:

1. An organic polymeric resin cassette for the housing of electromagnetic recording tape characterized by the fact that at least one major surface of the cassette has a coating of between 0.5 to 250 micrograms per square inch of a non-integral non-volatile, electrically conductive, organic composition thereon.

2. The cassette of claim 1 wherein electromagnetic recording tape is present within said cassette.

3. The cassette of claim 2 wherein said tape is one-half inch audio-video electromagnetic recording tape.

4. The cassette of claim 2 wherein said tape is eight millimeter audio-video electromagnetic recording tape.

5. The cassette of claim 2 wherein said tape is 3.8 millimeter audio electromagnetic recording tape.

6. The cassette of claim 1 wherein at least twenty-five percent of all interior and exterior surfaces of the cassette are coated with said composition and said composition is non-integral.

7. The cassette of claim 1 wherein at least seventy-five percent of all interior and exterior surfaces of the cassette are coated with said composition and said composition is non-integral.

8. The cassette of claim 2 wherein at least seventy-five percent of all interior and exterior surfaces of the cassette are coated with said composition.

9. The cassette of claim 3 wherein at least seventy-five percent of all interior and exterior surfaces of the cassette are coated with said composition.

10. The cassette of claim 1 wherein substantially all interior and exterior surfaces of the cassette are coated with said composition 11. The cassette of claim 2 wherein substantially all interior and exterior surfaces of the cassette are coated with said composition.

12. The cassette of claim 3 wherein substantially all interior and exterior surfaces of the cassette are coated with said composition.

13. The cassette of claim 1 wherein said composition is present in an amount between 0.5 and 250 micrograms per square inch and comprises a material which is selected antistatic compositions from the group consisting of (a) quaternary amines, (b) quaternary phosphines, and (c) perfluorinated ionic compounds.

14. The cassette of claim 2 wherein said composition is present in an amount between 0.5 and 250 micrograms per square inch and comprises a material which is selected antistatic compositions from the group consisting of (a) quaternary amines, (b) quaternary phosphines, and (c) perfluorinated ionic compounds.

15. The cassette of claim 3 wherein said compositon is present in an amount between 0.5 and 250 micrograms per square inch and comprises a material which is selected antistatic compositions from the group consisting of (a) quaternary amines, (b) quaternary phosphines, and (c) perfluorinated ionic compounds.

16. The cassette of claim 1 wherein said composition comprises a fluorinated anionic surfactant which is an amine salt of an acid containing a fluorinated organic radical and an antistatic agent which is an ionic salt of an amine.

17. The cassette of claim 2 wherein said composition comprises a fluorinated anionic surfactant which is an amine salt of an acid containing a fluorinated organic radical and an antistatic agent which is an ionic salt of an amine.

18. The cassette of claim 3 wherein said composition comprises a fluorinated anionic surfactant which is an amine salt of an acid containing a fluorinated organic radical and an antistatic agent which is an ionic salt of an amine.

19. The cassette of claim 17 wherein at least seventy-five percent of all interior and exterior surfaces of the cassette are coated with said composition in an amount between 1 and 100 micrograms per square inch and the anion molar percent of the fluorinated organic radical is between 1.8 and 42.9 percent of the mixture of the two ingredients.

20. The cassette of claim 18 wherein at least seventy-five percent of all interior and exterior surfaces of the cassette are coated with said composition in an amount between 1 and 100 micrograms per square inch and the anion molar percent of the fluorinated organic radical is between 1.8 and 42.9 percent of the mixture of the two ingredients.

* * * * *